Figure 1:
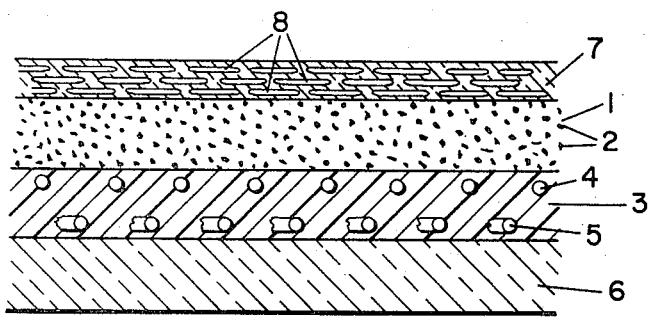

United States Patent [19]
Yaeger

[11] 3,836,417
[45] Sept. 17, 1974

[54] LAMINATE FOR HUMAN HABITATION

[75] Inventor: Luther LeMasters Yaeger, Houston, Tex.

[73] Assignee: Presciencia Limited, Basel, Switzerland

[22] Filed: May 23, 1973

[21] Appl. No.: 363,198

Related U.S. Application Data

[63] Continuation of Ser. No. 125,368, March 17, 1971, abandoned.

[52] U.S. Cl................ 161/5, 161/60, 161/143, 161/144, 161/162, 161/165, 161/168, 161/170, 161/189, 161/218, 161/254, 161/408
[51] Int. Cl.................... B44f 1/00, B32b 5/12
[58] Field of Search......... 161/5, 60, 143, 144, 162, 161/165, 168, 170, 189, 218, 254, 408

[56] References Cited
UNITED STATES PATENTS

| | | | |
|---|---|---|---|
| 2,454,910 | 11/1948 | Carr | 264/112 |
| 2,592,882 | 4/1952 | Fisher et al. | 161/4 |
| 3,215,590 | 11/1965 | Purvis | 161/163 |
| 3,556,914 | 1/1971 | Juras | 161/5 |

*Primary Examiner*—William J. Van Balen
*Attorney, Agent, or Firm*—John M. Diehl

[57] ABSTRACT

In human habitations suitable for mass production, there is a need for a flexible foldable film or sheet material having a combination of extreme light resistance, fatigue resistance, and heat reflection. I have found that a superior combination, and the only one for which an accelerated test indicates permanence over a period exceeding 40 years, comprises the following elements: a flexible foldable film assembly, the outermost layer of which consists of opaque flakes, preferably of metal, arranged substantially with the flat side parallel to the surface, and held in a matrix of a resin belonging in the groups of acrylates and methacrylates, superimposed upon a black thermoplastic film containing at least 4 percent of a finely dispersed carbon black, this film being followed by a central layer having a modulus at least 50 percent lower than its adjacent layers, so that it will permit flexing while minimizing the stresses in such flexing. This low modulus layer further contains continuous fibers arranged in layers so that the fibers in each layer are substantially parallel with each other; and further, another second outside layer, on the other side of the central layer, at least one of the outer layers having stiffness and resistance higher than those of the said low modulus central layer, and preferably similar to that of the first outside layer on the opposite side of the said low modulus layer.

6 Claims, 4 Drawing Figures

PATENTED SEP 17 1974　3,836,417

LAMINATE FOR HUMAN HABITATION

This is a continuation, of application Ser. No. 125,368, filed 3-17-71 now abandoned.

DESCRIPTION

This invention relates to flexible foldable plastic film material, and more particularly to material adapted for use in lightweight structures such as permanent or semi-permanent pallet covers, tents, air supported buildings or semi-temporary roofs extending over spans from 9 to 100 ft., and the like.

Heretofore resistant outdoor covers have been made from various plastic films including the reinforced plastic laminates, and in various pigmentations including aluminum flake and carbon black. However all of these products of prior art had severe drawbacks as to duration and operation over extended periods of time. The aluminum coated films were found practically to show marked deterioration already after 2 years, and to have lost most of their strength in 5 to 6 years. The black plastic covers likewise were found to lose most of their strength within very short time intervals, by which I mean 2 to 4 years. Inasmuch as stabilities of 20 – 40 years are required for building uses and permanent storage, these prior art materials are inadequate for these purposes. In spite of intense searching, it has not been possible for industry to provide foldable flexible plastic materials having the requisite stability for such uses at a reasonable cost.

Claims for duration of 10 to 20 years have been asserted for coatings of polyvinyl fluoride. However, I have found that while the polyvinyl fluoride films retain clarity for very long periods, their tensile strength particularly when the humidity is high can decline as much as 50 percent in a year and will decline over a period of three to five years to that extent even when the film is pigmented.

An object of this invention is a film system, which remains flexible and foldable, but which resists light deterioration by an order of magnitude more than any previously available flexible foldable material. Another object is a novel plastic film capable of superior performance under conditions of light, heat and humidity normally conducive to deterioration of such films.

Another object is a film superior for use in the building industry where long-term permanence together with light weight are requisite.

Another object is a permanent human habitation using as a principal primary outside construction material a flexible foldable film of extreme weather resistance.

Further objects will become apparent as the following detailed description proceeds.

In accordance with my invention, I use as a base film a dispersion of carbon black in a thermoplastic matrix, and above this film I apply a light directive layer which blocks light from passing perpendiculary and only permits the passage of light rays at an angle less than 20° and preferably less than 10° with the surface of said film.

The invention is further illustrated by the figures, of which

Figure 2:
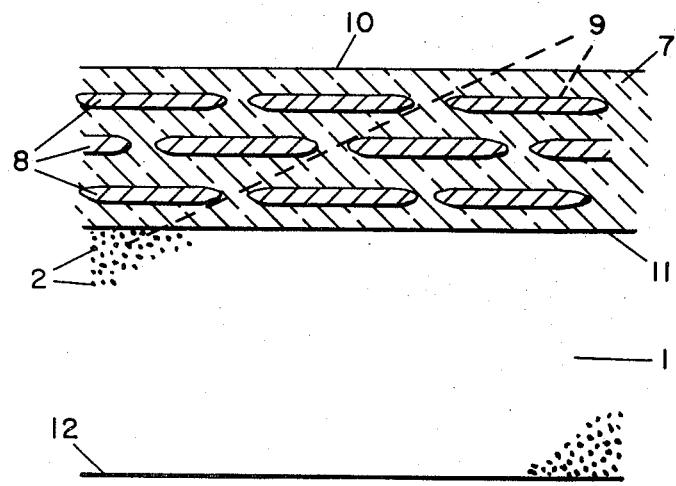
Figure 3:
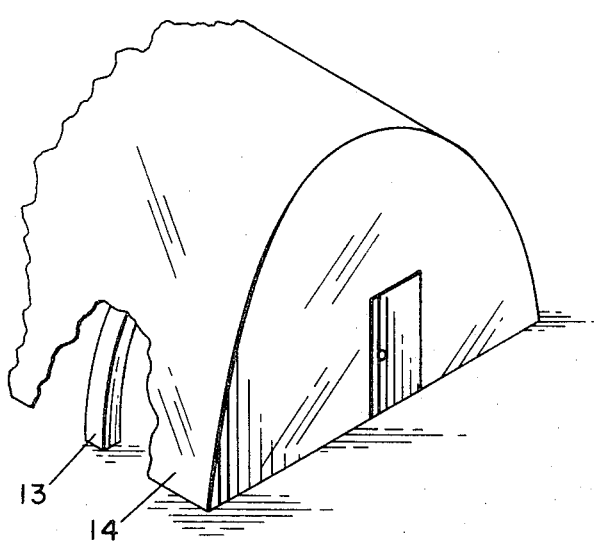
Figure 4:
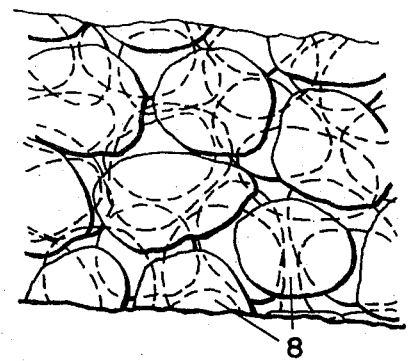

FIG. 1 is a magnified cross-section of the article of the invention,

FIG. 2 a still further increased magnification of a art of the cross-section, and FIG. 3 a human habitation embodying the invention, FIG. 4 is a top view of the outer layer 7.

Referring now to FIG. 1, 1 is a film of polyethylene, in which a light absorbing substance such as for example 4 percent of a rubber tire grade of carbon black is well dispersed. Generally I prefer to use 2 – 10 percent of dispersed particles on the weight of the film. 4 percent appears to be the optimum when carbon black is used. Larger quantities may be used, but generally do not further enhance the stability. Other ultraviolet opaque substances are, for example, zinc sulfide, iron oxide, tungsten oxide, germanium, phloroglucinol-formaldehyde resin and arsenic trisulfide. 2 is a particle of the dispersed light absorber. 3 is a layer of a plastic or elastomer having lower modulus than film 1, and in or on which are carried reinforcing fibers. In the present embodiment, these are non-woven, positioned in two layers, the fibers in each layer, 4 and 5 respectively, being parallel with each other. 6 is another outer film, which may be identical with film 1, or, if light only from one side is required, may be, transparent or pigmented in any attractive or appropriate color without regard to light absorbency or protection on that side.

7 is a layer applied as a pre-made film or as a coating, which contains in a matrix of light resistant plastic, preferably an acrylate or methacrylate, at least three layers of flakes 8 opaque in the ultraviolet, spaced together by a distance on the average less than one-fifth of the width of said flakes, and oriented parallel to the surface of the said film and spaced so closely from each other than only light rays having an angle of less than 20 percent, and preferably less than 10 percent, are able to penetrate said layer.

This layer can additionally carry some dye or pigment to give it an attractive appearance, but this is not essential to the invention.

FIG. 2 shows a detail view of layers 1 and 7, and the effect of these layers on light rays 9 which are entering. 10 is the outer surface of layer 7, 11 the interphase between 1 and 7. It is seen that due to the geometry of the flakes 8, light rays impinging on the system anywhere near perpendicularly will be unable to penetrate, as they will be blocked by the particles 8. The disposition of these particles is shown perpendicularly in FIG. 4 — with three layers of flakes oriented parallel with the surface they are covering the overlap will be adquate to block practically all perpendicular or anywhere near perpendicular light rays. Those rays which can enter to any significant degree will have an angle of no more than 20° and generally not more than 10° with the film surfaces.

A light ray entering at this low angle will travel obliquely through layer 7, whereby the probability of contact with and effective blockage by the carbon particles it encounters will practically ensure the absense of any effective light radiation in the inner layers of the film aggregate, and the survival of this aggregate substantially unimpaired by light for at least 40 years.

FIG. 3 shows a human habitation comprising arches of plywood 13 onto which have been fastened (by nailing, tying, glueing or other appropriate means) sheets of the material of this invention 14 as described above and shown in the other illustration, so that layer 7 is facing the side which is most strongly illuminated, which is usually the outside. The building has a width of 20 feet and a length of 60 feet. The distance between the arches equals the width of the laminated roll used, usually either 55 inches or 70 inches.

The flakes opaque to ultraviolet may be flakes of metals, such as for example, aluminum, copper, zinc or stainless steel, or they may be flakes of glasses of high ultraviolet absorbency, or of zinc sulfide, or organic ultraviolet absorbent phthalocyanines or the like. The distance between the flakes in direction perpendicular to the film should not exceed 20 percent of their average width.

The matrix material in which these flakes are imbedded is a translucent resin of high resistance to ultraviolet radiation, and simultaneously bondable to the polymeric fibers employed, such as polyvinyl or polyallyl fluorides, or preferably, acrylates, in which term I here include also the methacrylates, which have a tensile strength inferior of that of the surface films 1 and 6, so that under stress the reinforcing fibers 4 and 5 will slide within the matrix layer 7, bunching together to maximize tear strength, and will not pierce and break through the said surface films, thus weakening the laminate.

Specifically, a suitable vehicle for the metallic flakes may consist of a randomly peroxide polymerized acrylic polymer from a monomer composition of ethyl and butyl acrylate (2:1 by volume). The monomers are diluted with an equal volume of hexane: ethyl acetate (4:1) to moderate the reaction. The resultant homogenous viscous concentrate is intimately intermixed with the flake material, thinned as may be necessary for the particular coating equipment employed as well known to those skilled in the art and applied to the film by spraying, air knife or reverse roller coating, or in any other convenient or practical manner. 1 percent benzoyl peroxide is a suitable catalyst; other peroxides may be used.

To obtain the suitable degree of compaction of the flakes in the coating, I prefer to employ from 3 to 6 parts by weight of aluminum paste to 1 part of solid copolymer, though usable results are obtained in ratios as high as 12:1 and as low as 2:1. The matrix preferably has a tensile modulus of $0.0001 \times 10^5$ to $0.30 \times 10^5$, and extensibility of at least 25 percent, and forms a firm bond with the plastic films employed when dried thereonto, or applied in any other manner which affords comparable opportunity to contact the interface and wet the film. A film made of ½ to 15 mils thickness, or preferably 4 to 10 mils, made under these conditions is dramatically superior to so-called "weather proof" or "weather resistant" films available heretofore, and compare favorably in durability with such time-honored building materials as wood, concrete and coated steel. A useful life in excess of 40 years thus appears assured.

While I am not limiting myself to any theory as to the cause of the dramatic breakthrough in permanence of thin flexible materials achieved by the practice of this invention, it is my belief that several factors contribute to this result. The basic annihilators of the destructive radiation, I believe, are the dispersed UV-opaque particles in film 1, but the spacing and disposition of the flake particles in the superimposed film ensure that any light ray penetrating into the dispersion layer 1 enters nearly parallely to the surface so that it would have to travel a distance many times greater than the thickness of the film in order to penetrate it. This ensures that each entering photon will encounter many times more dispersed particles than would be the case if it entered more perpendicularly.

The near absolute protection from ultraviolet thus accorded the centrally disposed reinforcements protect these practically indefinitely, and the lower modulus of the matrix in which the reinforcements are positioned prevent or cushion such sharp shocks as might otherwise result in micro-cracks in the surface skins with progressively increasing access to light resulting.

All of these factors, and possibly others as well, co-act to achieve the unparalleled and surprising durability to weathering in the extremely lightweight material of this invention.

Flexural fatigue resistance is particularly important in structures which are exposed to varying wind pressures and snow loads, or in any roof or cover structures which may oscillate in the wind. This resistance is very greatly enhanced by (1) placing the reinforcing fibers close to the center of the structure where the change is position on bending is minimized, and (2) by providing an inner layer of higher elasticity or softness than the outer protective or carrying films, so that any motion between these in bending is taken up in this inner lower modulus layer, thereby avoiding such stress concentrations as might exceed the elastic limits of the outer film materials.

As suitable film materials may be mentioned in particular polyolefin films, including for example polyethylene, polypropylene and their copolymers, polyvinyl and vinylidene halide films, of which the chloride and fluoride appear the most important; "Hypalon" films made by the E. I. du Pont de Nemours Co. and believed to be sulfonated polyethylene films; polyoxyphenol films, polyamid films such as the nylons, polyacrylonitril and its co-polymers, chlorinated rubber films, polyester films such as polydiethyleneglycol terephthalate and analogues, cellulose esters and ethers and regenerated cellulose, and films of properties similar to these made from other plastics now existent or that may be invented at any future time. Fibers of the same organic materials may be used as reinforcements.

The reinforcing fibers may be held in a matrix similar to the one used for the flakes, except that the high resistance to light is not required, as hardly any light will reach this inner layer. In addition to the acrylate materials used to hold the flakes in layer 7, the matrix material in layer 3 may include elastomeric or deformable plastics different from these, such as a medium acrylonitrile styrene butadiene rubber latex modified with rosin ester gum tackifier for polyvinyl chloride film, or butyl rubber cements with ester gum for polyethylene laminates. Other suitable vehicles include low molecular weight Nylon 6, polyvinyl acetate-ethyl acrylate copolymer, and the like. Soft or rubbery polymers which can be made to adhere to the films directly or by intermediate bonding layers are also suitable, such as for example polyvinyl butyral, ethylene-propylene elastomers, butyl cellulose, and lower preferably solid polymers of the plastics used in the films. The matrix material in or near the center area 3 of this invention should have greater deformability or lower modulus than the outer films: soft or rubbery polymers which can be made to adhere to the films directly or by intermediate bonding layers are suitable, such as for example polyvinyl butyral, ethylene-propylene elastomers, rubber, acrylate or methacrylate elastomers, butyl cellulose, and lower polymers of the plastics used in the films.

For the outer layers which carry the flake material which limits the incidence angle of plastic film, I require maximal light resistance; for this reason the acrylate and methacrylate polymers and co-polymers are preferred. Should at any future time another substance be discovered of similar or superior light resistance and at least equivalent mechanical and adhesion properties, these would be considered equivalents to the acrylates and methacrylates for the purposes of this invention.

The films should preferably have a thickness in the range of ¼ mil to 10 mil, the ultraviolet opaque disperse pigment should be present in a percentage ranging from 2 to 20 percent and preferably 3 – 6 percent. The reinforcing fibers should be preferably present within a matrix softer than the films adjoining it on both sides and should preferably be arranged in a non-woven regular pattern, parallel with each other within each fiber layer.

Having thus disclosed my invention, I claim:

1. A permanent human habitation, comprising a light and weather exposed outer surface which is also the surface of a flexible foldable laminate of at least two films, at least the outer one of which contains dispersed therein from 2 to 10 percent of its weight of ultraviolet opaque particles; said films being separated from each other by a layer of greater deformability and an extensibility of at least 25 percent, this separating layer holding non-woven reinforcing fibers in an orderly arrangement, movable in relation to each other in response to stresses; the said light and weather exposed outer surface having thereon a coating containing at least three layers of ultraviolet opaque flakes, said flakes being oriented substantially parallel to the surfaces of the films on which they rest, the matrix of said coating having a tensile modulus of $0.0001 \times 10^5$ to $0.30 \times 10^5$ and being resistant to ultraviolet radiation and adherent to the said flakes and the adjacent opaque particles containing film.

2. The permanent human habitation of claim 1, the said reinforcing fibers being arranged in a diamond pattern.

3. The permanent human habitation of claim 1, the said films being ¼ to 10 mils thick, the dispersed ultraviolet opaque particles constituting 2 to 20 percent of the film carrying the same.

4. The permanent human habitation of claim 1, in which the said ultraviolet opaque dispersed particles are carbon black and the said matrix of the flake containing coating an acrylic polymer.

5. The permanent human habitation of claim 1, in which the said ultraviolet opaque flakes are spaced no more than one-fifth of their thickness away from each other, and so that substantially no ray of ultraviolet can penetrate the coating of said flakes unless its angle with the film surface is less than 20°.

6. A light weight construction material of extreme weathering resistance, comprising a flexible foldable laminate of at least two films, at least the outer one of which contains dispersed therein from 2 to 10 percent of its weight of ultraviolet opaque particles; said films being separated from each other by a layer of greater deformability and an extensibility of at least 25 percent, this separating layer holding non-woven reinforcing fibers in an orderly arrangement, movable in relation to each other in response to stress; the said light and weather exposed outer surface having thereon a coating containing at least three layers of ultraviolet opaque flakes, said flakes being oriented substantially parallel to the surfaces of the films on which they rest, the matrix of said coating having a tensile modulus of $0.0001 \times 10^5$ to $0.30 \times 10^5$ and being resistant to ultraviolet radiation and adherent to the said flakes and the adjacent opaque particles containing film.

* * * * *